US011564067B1

(12) United States Patent
Brahma

(10) Patent No.: US 11,564,067 B1
(45) Date of Patent: Jan. 24, 2023

(54) VOICEMAIL TRANSCRIPTION DELIVERY

(71) Applicant: T-Mobile USA, Inc., Bellevue, WA (US)

(72) Inventor: Dhurjati Brahma, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 30 days.

(21) Appl. No.: 17/301,013

(22) Filed: Mar. 22, 2021

(51) Int. Cl.
*H04W 4/14* (2009.01)
(52) U.S. Cl.
CPC .................................... *H04W 4/14* (2013.01)
(58) Field of Classification Search
CPC ......... H04W 4/14; H04W 4/12; H04M 3/533; H04M 2201/60; H04M 2203/253; H04M 2203/4536; H04M 1/72433; H04M 3/5333; G10L 15/26
See application file for complete search history.

(56) References Cited

U.S. PATENT DOCUMENTS

| 2010/0150322 | A1* | 6/2010 | Yin | H04M 11/10 379/88.14 |
| 2010/0158214 | A1* | 6/2010 | Gravino | H04M 3/537 455/466 |
| 2011/0305327 | A1* | 12/2011 | Shaw | H04M 3/53333 379/88.14 |
| 2013/0101097 | A1* | 4/2013 | Shaw | H04M 3/53333 379/88.22 |
| 2013/0121481 | A1* | 5/2013 | Mikan | H04L 51/216 379/88.14 |

* cited by examiner

*Primary Examiner* — Marcus Hammonds
(74) *Attorney, Agent, or Firm* — Lee & Hayes, P.C.

(57) ABSTRACT

A voicemail service node of a carrier network may configure a voicemail profile for a subscriber to provide voicemail transcription delivery. For example, a voicemail service node may receive, from a voicemail client on a user device, a request to activate delivery of voicemail transcription for the user device via the voicemail client. The voicemail service node may determine device configuration information for delivery of voicemail transcription, determine, based on the device configuration information and the activation request, a delivery configuration for delivery of voicemail transcription via the voicemail client using a set of one or more modes of delivery of voicemail transcription, and configure the voicemail profile associated with the user device to cause delivery of voicemail transcription to the user device using the set of one or more modes of delivery of voicemail transcription.

17 Claims, 5 Drawing Sheets

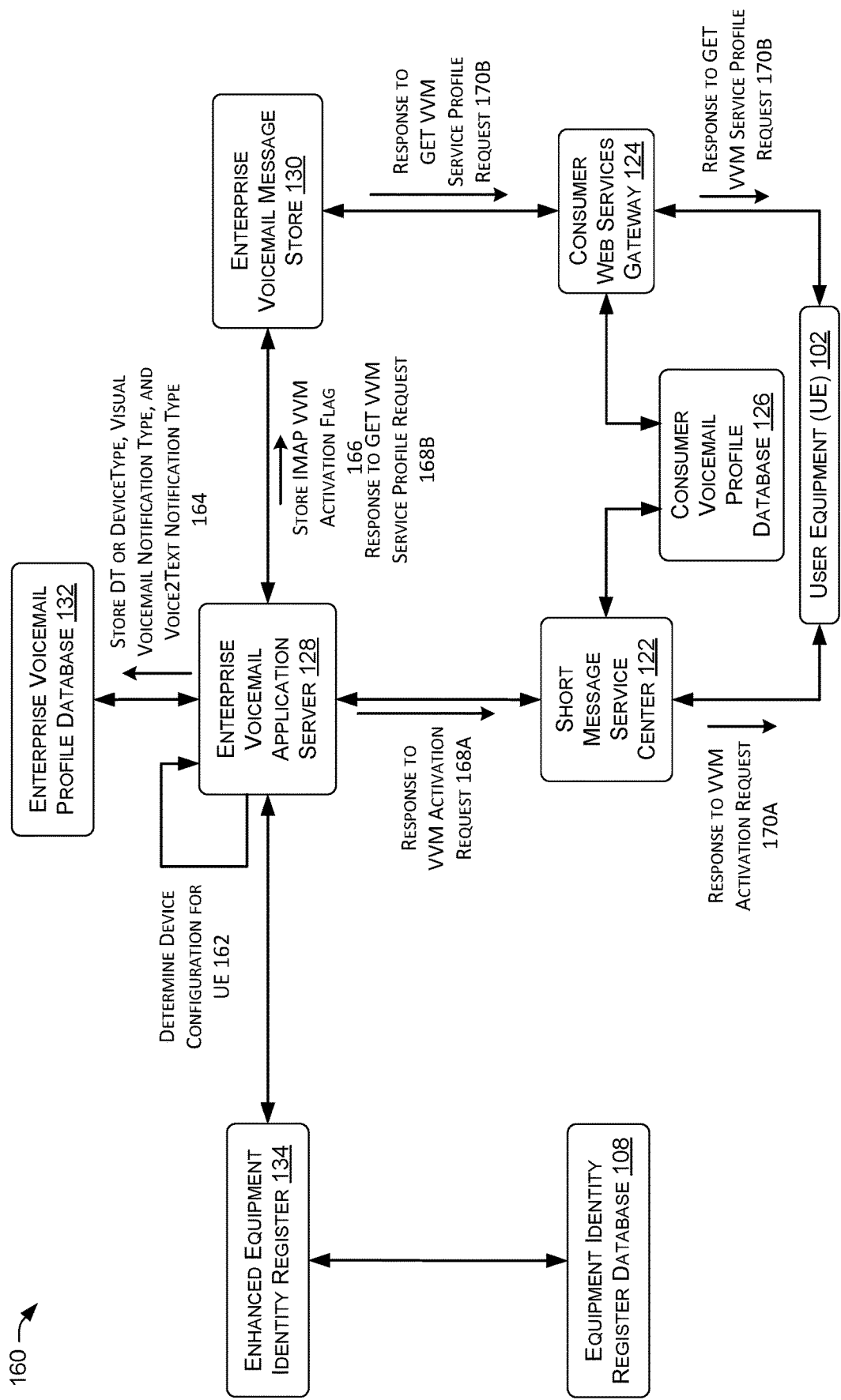

200 ⬊

```
┌─────────────────────────────────────────────────────────────────────┐
│ RECEIVE, BY A VOICEMAIL SERVICE NODE FROM A VISUAL VOICEMAIL CLIENT │
│ ON A USER DEVICE, A REQUEST TO ACTIVATE DELIVERY OF VOICEMAIL       │
│ TRANSCRIPTION FOR THE USER DEVICE 202                               │
└─────────────────────────────────────────────────────────────────────┘
                                  ↓
┌─────────────────────────────────────────────────────────────────────┐
│ DETERMINE, BY THE VOICEMAIL SERVICE NODE, DEVICE CONFIGURATION      │
│ INFORMATION FOR DELIVERY OF VOICEMAIL TRANSCRIPTION FOR THE USER    │
│ DEVICE VIA THE VISUAL VOICEMAIL CLIENT 204                          │
└─────────────────────────────────────────────────────────────────────┘
                                  ↓
┌─────────────────────────────────────────────────────────────────────┐
│ DETERMINE ONE OR MORE PARAMETERS FOR VOICEMAIL TRANSCRIPTION        │
│ DELIVERY FROM A VOICEMAIL PROFILE ASSOCIATED WITH THE USER DEVICE   │
│ 206                                                                 │
└─────────────────────────────────────────────────────────────────────┘
                                  ↓
┌─────────────────────────────────────────────────────────────────────┐
│ DETERMINE, BASED ON THE DELIVERY BASED ON DEVICE CONFIGURATION      │
│ INFORMATION, THE PARAMETER(S) FROM THE VOICEMAIL PROFILE AND/OR THE │
│ VVM ACTIVATION REQUEST, A DELIVERY CONFIGURATION FOR DELIVERY OF    │
│ VOICEMAIL TRANSCRIPTION VIA THE VISUAL VOICEMAIL CLIENT USING A SET │
│ OF ONE OR MORE MODES OF DELIVERY OF VOICEMAIL TRANSCRIPTION 208     │
└─────────────────────────────────────────────────────────────────────┘
                                  ↓
┌─────────────────────────────────────────────────────────────────────┐
│ BASED ON THE DELIVERY CONFIGURATION, CONFIGURE THE VOICEMAIL        │
│ PROFILE ASSOCIATED WITH THE USER DEVICE TO CAUSE DELIVERY OF        │
│ VOICEMAIL TRANSCRIPTION TO THE USER DEVICE USING THE SET OF ONE OR  │
│ MORE MODES OF DELIVERY OF VOICEMAIL TRANSCRIPTION 210               │
└─────────────────────────────────────────────────────────────────────┘
                                  ↓
┌─────────────────────────────────────────────────────────────────────┐
│ RECEIVE, BY THE VOICEMAIL SERVICE NODE, A VOICEMAIL ASSOCIATED WITH │
│ THE USER DEVICE 212                                                 │
└─────────────────────────────────────────────────────────────────────┘
                                  ↓
┌─────────────────────────────────────────────────────────────────────┐
│ BASED ON THE VOICEMAIL PROFILE, DELIVER THE VOICEMAIL TRANSCRIPTION │
│ OF THE VOICEMAIL VIA ONE OR MORE MODES OF DELIVERY OF VOICEMAIL     │
│ TRANSCRIPTION 214                                                   │
└─────────────────────────────────────────────────────────────────────┘
```

FIG. 2

VOICEMAIL TRANSCRIPTION DELIVERY

BACKGROUND

In recent years, mobile devices have advanced from offering simple voice calling services within wireless communication networks to providing users with many new features. In some examples, mobile devices may provide voicemail and voicemail transcription delivery. However, the proliferation of different mobile devices and/or visual voicemail client types may result in difficulty in managing and configuring voicemail and voicemail transcription delivery securely.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A-1C are block diagrams illustrating a communication system that may provide configuration of voicemail transcription delivery based on device configuration information set by an operator of a carrier network, parameters in a voicemail profile and/or a visual voicemail (VVM) activation request.

FIG. 2 is a flow diagram illustrating an example method of providing configuration of voicemail transcription delivery based on device configuration information set by an operator of a carrier network, parameters in a voicemail profile and/or a VVM activation request.

DETAILED DESCRIPTION

Figure 1A:
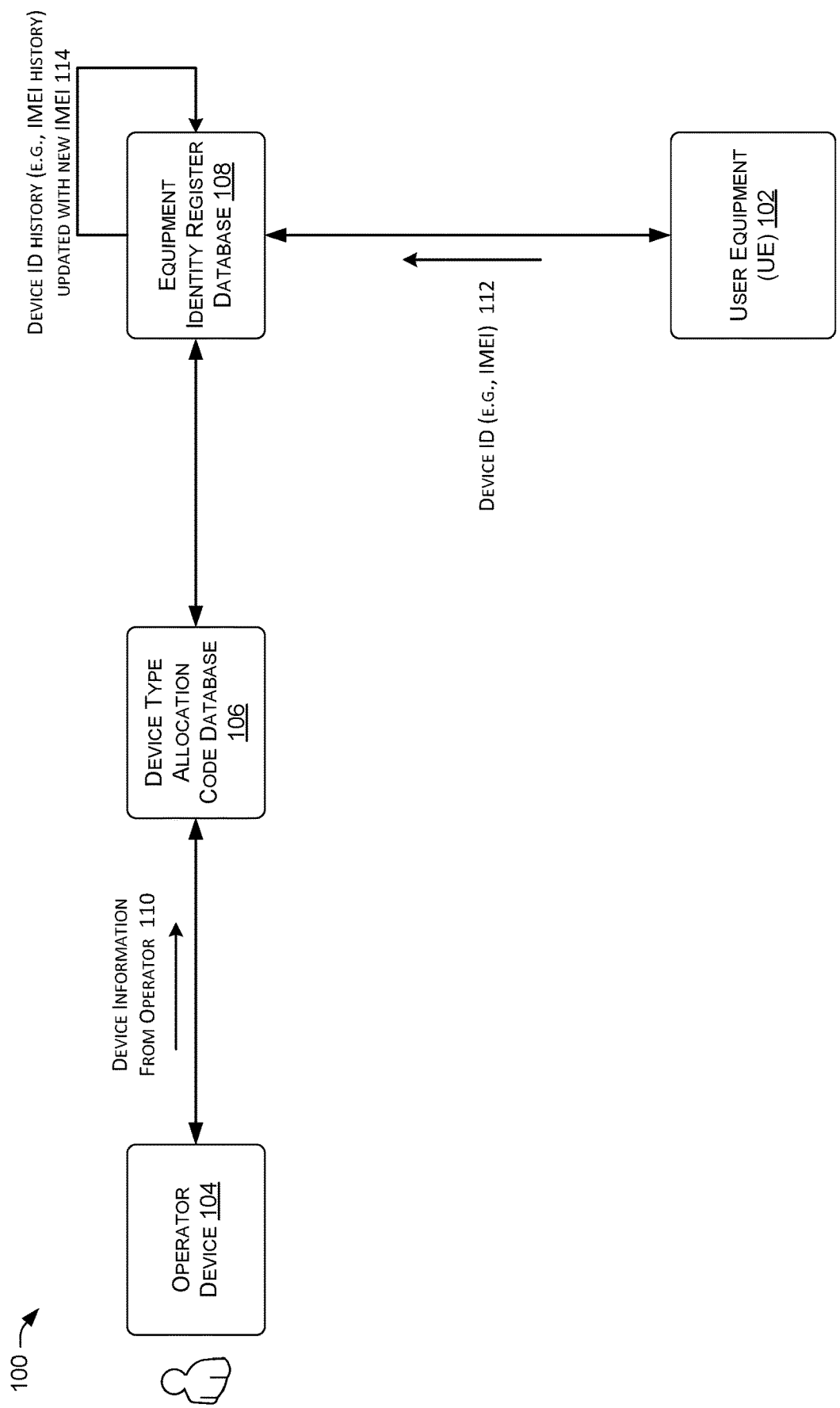

The described implementations include devices, systems, and methods that provide configuration of voicemail transcription delivery to mobile devices in, for example, a carrier network. In some examples, voicemail transcriptions may be delivered to subscribers through multiple modes of delivery, such as via short message service (SMS), e-mail, or via a visual voicemail client (e.g., within a mailbox of visual voicemail client). Some examples may provide for configuration of voicemail transcription delivery to multiple types of mobile devices and/or multiple types of voicemail clients. Some example devices, systems, and methods may configure voicemail transcription delivery based on device configuration information set by an operator of a carrier network, parameters in a voicemail profile and/or a VVM activation or a VVM deactivation request from the mobile device.

For example, a voicemail application server (VMAS) may configure voicemail transcription delivery in a voicemail profile for a subscriber based on the VVM activation request, device configuration information from an equipment identity register database (EIRD), and parameters in the voicemail profile of the subscriber associated with the VVM activation request. During VVM activation, the VMAS may request and receive the device configuration information from the EIRD via an enhanced equipment identity register (EEIR). Similarly, the VMAS may request the voicemail profile of the subscriber associated with the VVM activation request from a voicemail profile database.

As mentioned above, the device configuration information from the EIRD may be set by an operator of a carrier network. The voicemail profile may include subscriber or user preferences that may indicate one or more types or modes of delivery for the voicemail transcription selected or set by the subscriber (e.g., a selection of whether voicemail transcription should be delivered to e-mail). The VMAS may compare the values returned from an EEIR, in the VVM activation request, and parameters in the voicemail profile against a lookup table to determine device configuration parameters for the UE. The lookup table may provide, for different values of the device configuration information, the parameter(s) from the voicemail profile and/or the VVM activation request, a set of one or more modes of delivery of voicemail transcription allowed by a carrier network for delivery of voicemail transcription for the user device via the voicemail client.

Providing for configuration of voicemail transcription delivery based on device configuration information set by the operator of a carrier network, the voicemail profile and/or the VVM activation request may provide multiple advantages. For example, security may be improved, and correct operation may be ensured. More particularly, by utilizing device configuration information set by the operator of the carrier network, which may be mobile device type and/or visual voicemail client application specific, unauthorized visual voicemail client applications and/or mobile devices may fail the VVM activation process. Second, due to the configuration being based on device configuration information set by the operator of the carrier network, subscriber error or mobile device side errors in configuration may be reduced. Third, some examples may utilize the device configuration information and the subscriber or user preferences of the voicemail profile to allow for automatic VVM activation and configuration of transcription delivery upon the subscriber changing devices and/or visual voicemail client type.

While IMAP and REST clients, as well as Enterprise and Consumer systems may be utilized in the discussions of example embodiments throughout this disclosure, this disclosure and the appended claims are not so limited. For example, other embodiments may utilize other systems, networks, protocols, and standards to accomplish similar functions.

Figure 1B:
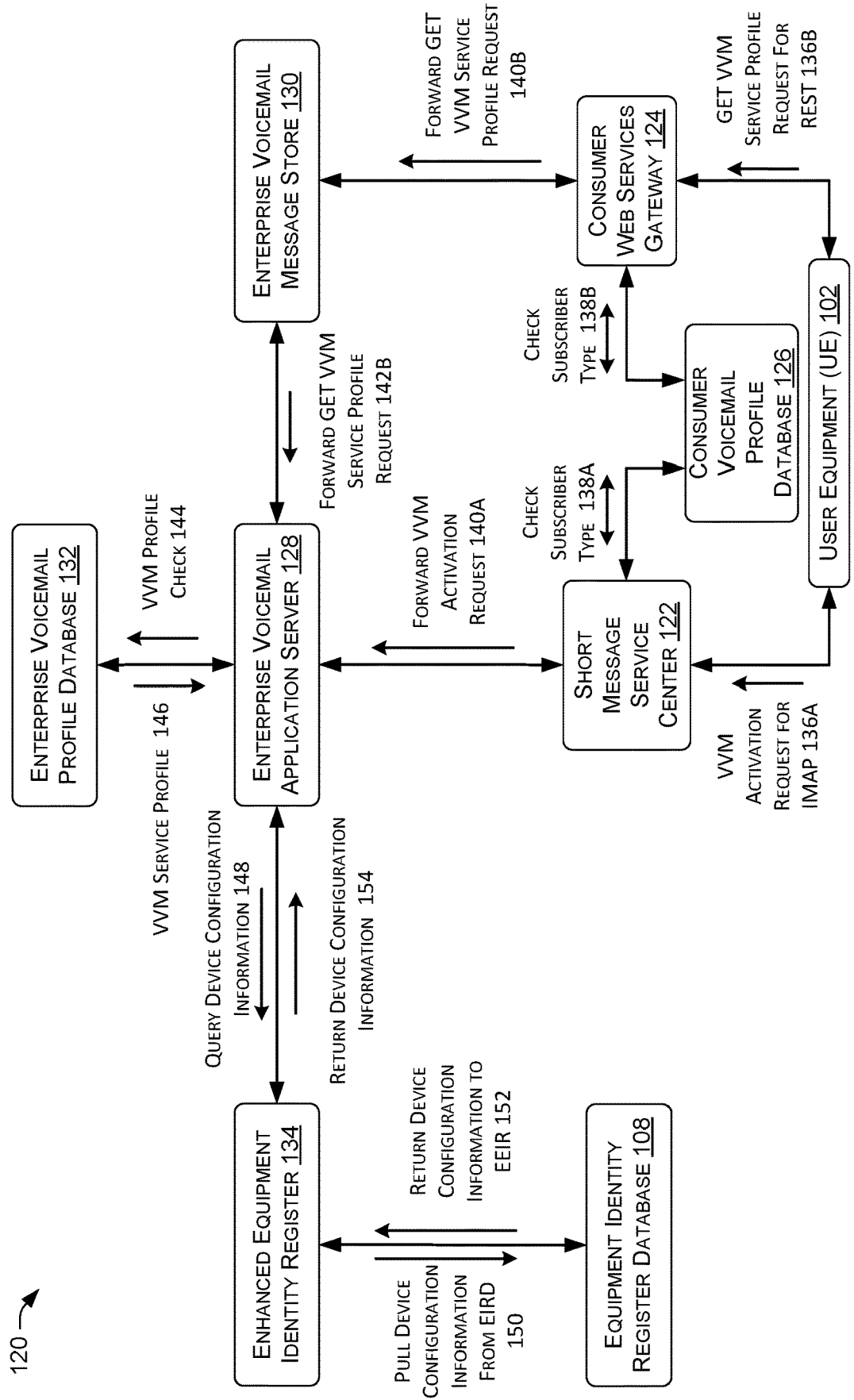

FIGS. 1A-1C illustrate an example telecommunication system, which may provide configuration of voicemail transcription delivery based on device configuration information set by an operator of a carrier network, parameters in a voicemail profile and/or a VVM activation request. In the particular illustrated example, the subscriber may be attempting to utilize voicemail transcription on an enterprise or Unified Communications and Collaboration (UC&C) system of a telecommunication system that may provide services to enterprise subscribers. However, examples are not so limited and other systems (e.g. consumer systems) may be utilized in place of enterprise systems and/or the telecommunications system may provide service to one subscriber type or the telecommunications system may include dedicated devices to provide service to each type of subscriber. These and other variations would be apparent in view of this disclosure.

FIG. 1A illustrates an example telecommunication system 100, which may provide configuration of voicemail transcription delivery based on device configuration information set by an operator of a carrier network, parameters in a voicemail profile and/or a VVM activation request. More particularly, FIG. 1A may illustrate example operations of the telecommunication system 100 for provisioning device configuration information and registering a user device with the telecommunication system 100. The system 100 includes user equipment (UE) 102, an operator device 104, a Device Type Allocation Code (DTAC) database 106, and an Equipment Identity Register (EIR) database 108. In some examples, the system 100 may be a carrier network.

The various network components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future network technology or evolution of an existing network technology (e.g., IP or Non-IP based). These are merely examples and the various network components described herein, may be capable of communicating via one or more of a 3G, 4G, 4G LTE, and/or 5G protocols.

The UE 102 may communicate with the carrier network components using an access network (not shown), which may comprise a cellular communication network or other type of wired or wireless network. Examples of wireless access networks include LTE, NR, WIFI, GSM EDGE Radio Access Network (GERAN), UMTS Terrestrial Radio Access Network (UTRAN), and other cellular access networks.

At 110, the operator device 104 may receive input of device information from an operator associated with the telecommunication system 100, (e.g. the operator of the carrier network). In some examples, the device information may be or be associated with device configuration information for a type of device or type of visual voicemail client. The device configuration information may be provided to the DTAC database 106. The device information 110 may be stored in the DTAC database 106 such that the device configuration information may be accessible to the EIR database 108.

At 112, during device registration (e.g., IMS registration), the user equipment 102 may push its device ID (e.g., IMEI) to the EIR database 108. The EIR database 108 may receive the device ID 112 and update a device ID history (e.g., IMEI history) for the subscriber (e.g., the subscriber's MSISDN) at 114.

FIG. 1B illustrates an example telecommunication system 120, which may provide configuration of voicemail transcription delivery based on device configuration information set by an operator of a carrier network, parameters in a voicemail profile and/or a VVM activation request. More particularly, FIG. 1B may illustrate example operations of the telecommunication system 120 for activating and configuring voicemail transcription delivery to the UE 102 in the telecommunication system 120 following the operations discussed above with regard to FIG. 1A. As illustrated, the operations may differ based on the visual voicemail client type (e.g., IMAP or REST). In FIGS. 1B and 1C, the operations for activating and configuring voicemail transcription delivery to a user equipment for an IMAP client are labeled with a numeral followed by an A (e.g., 136A). Alternative operations for activating and configuring voicemail transcription the delivery for a REST client are labeled with a numeral followed by a B (e.g., 136B). Other operations are included in the VVM activation and configuration of both an IMAP client and a REST client and are labeled with numerals alone. The system 120 includes user equipment (UE) 102, the Equipment Identity Register (EIR) database 108, a short message service center (SMSC) 122, a consumer web services gateway 124, a consumer voicemail profile database 126, an enterprise voicemail application server (VMAS) 128, an enterprise voicemail message store 130, an enterprise voicemail profile database 132 and an enhanced equipment identity register (EEIR) 134.

At 136, the VVM activation is initiated by a subscriber operating the user equipment 102. In the case of the VVM activation of an IMAP client, at 136A, the UE 102 may send a VVM activation request for IMAP to a short message service center (SMSC). For example, when a user enables visual voicemail (VVM) on a native google IMAP VVM client, the IMAP VVM client may send an activation SMS to a specific short code (e.g., 122) which is received at the SMSC 122 (e.g. an activation SMS of "Activate:dt=15", where dt=15 may indicate the VVM client is a native IMAP VVM client of the UE operating system). In the case of the REST VVM client on the UE 102, at 136B, the UE 102 may first send a request to retrieve and check VVM Service Profile for REST VVM client to a consumer Web Services Gateway (WSG) 124. For example, when a user initially launches a carrier's REST Over the Top (OTT) VVM client, the REST VVM client may first send a GET request to retrieve and check the VVM Service Profile of the user towards a consumer WSG.

At 138, the telecommunication system may determine whether the subscriber is an enterprise subscriber (e.g., a subscriber of the requested system). In the case of VVM activation of an IMAP client, at 138A, the SMSC 122 may receive the activation SMS from the client. Then, based on an internal SMSC rule for the short code (e.g., Short code 122), the SMSC 122 may query a consumer voicemail profile database 126 to check if the subscriber associated with the VVM activation request is an enterprise subscriber (e.g., by checking if parameter "isUCCUser"=True). Similarly, in the case of the activation of a REST client, at 138B, the consumer WSG 124 may query a consumer voicemail profile database 126 to check if the subscriber associated with the GET VVM Service Profile request is an enterprise subscriber (e.g., by sending an XCAP request to the consumer voicemail profile database to check if parameter "LineType=UCCGSM"). If the subscriber is not an enterprise subscriber, the operations may terminate with an error. Otherwise, the operations may continue to 140.

At 140-142, the activation or GET VVM Service Profile request may be forwarded to the enterprise voicemail application server (VMAS) 128. In the case of VVM activation of an IMAP client, at 140A, the SMSC 122 may route the VVM activation request to the enterprise VMAS 128. In some examples, the SMSC 122 may forward the VVM activation request in a "deliver_sm" to the enterprise VMAS 128 over SMPP protocol. In the case of the activation of a REST client, at 140B, the consumer WSG 124 may forward the GET VVM Service Profile request to the enterprise voicemail message store 130. Then, at 142B, the enterprise voicemail message store 130 may forward the GET VVM Service Profile request to the enterprise VMAS 128. In some examples, the REST GET VVM Service Profile request may be forwarded to the enterprise VMAS 128 at 140B and 142B as a GET VVM Service Profile request.

At 144, once the activation or GET VVM Service Profile request has been received by the enterprise VMAS 128 (e.g., at 140A or 142B), the enterprise VMAS 128 may query the enterprise voicemail profile database 132 to retrieve information of the subscriber. More particularly, the enterprise VMAS 128 may request the VVM Service Profile information of the subscriber. At 146, the enterprise voicemail profile database 132 may determine if the subscriber is an enterprise subscriber, and, if so, the enterprise voicemail profile database 132 may return VVM service profile information of the subscriber to the enterprise VMAS 128.

At 148, the enterprise VMAS may query device configuration information from the EEIR 134. For example, the enterprise VMAS 128 may query the EEIR 134 over a Simple Object Access Protocol (SOAP) interface to check the device configuration information for the device type and/or visual voicemail client type of the UE 102. In some examples, the device configuration information requested may include the device operating system and visual voicemail flags for the device type and/or visual voicemail client type. At 150, the EEIR 134 may request the device configuration information from the EIRD 108. The EIRD 108 may, in turn, pull the device configuration information from the DTAC database 106 or the EIRD 108 may use a copy of the device configuration information already obtained by periodically synchronization of the latest device configuration information with the DTAC database 106. In some examples, the EEIR 134 may request the device configuration information for the device type and/or visual voicemail client type of the UE 102 from the EIRD 108 based on the updated IMEI information discussed at 114 of FIG. 1A. At 152, the EIRD 108 may return the device configuration information to the EEIR 134. Then, at 154, the EEIR 134 may return the device configuration information to the enterprise VMAS 128. The operations may then continue in FIG. 1C.

FIG. 1C illustrates an example telecommunication system 160, which may provide configuration of voicemail transcription delivery based on device configuration information set by an operator of a carrier network, parameters in a voicemail profile and/or a VVM activation request. More particularly, FIG. 1C may illustrate example operations of the telecommunication system 160 for activating and configuring voicemail transcription delivery to a user equipment 102 in the telecommunication system 160 following the operations discussed above with regard to FIG. 1B. The system 160 includes user equipment (UE) 102, the Equipment Identity Register (EIR) database 108, the short message service center (SMSC) 122, the consumer web services gateway 124, the consumer voicemail profile database 126, the enterprise voicemail application server (VMAS) 128, the enterprise voicemail message store 130, the enterprise voicemail profile database 132 and the enhanced equipment identity register (EEIR) 134.

Upon receiving the device configuration information from the EEIR 134, at 162, the enterprise VMAS 128 may configure voicemail transcription delivery for the UE 102 based on the device configuration information for the device type and/or visual voicemail client type of the UE 102, parameters in the voicemail profile and/or the VVM activation request. For example, based on an indication of the VVM client type and/or requested delivery types from the activation request, operating system and visual voicemail client information included in the device configuration information returned by the EEIR, and subscriber settings in the voicemail profile, the enterprise VMAS may configure voicemail transcription delivery for the activation request.

In a particular example, the VVM activation request may include a value "dt" that may indicate the visual voicemail client type of the UE 102 and/or a type of delivery to be activated. For example, a first value of "dt" may indicate the visual voicemail client is a first client type (e.g., a native IMAP client), a second value may indicate the visual voicemail client is a second client type (e.g., a carrier OTT IMAP VVM client) and indicate visual voicemail client mailbox delivery is requested and not SMS delivery, and a third value may indicate the visual voicemail client is the second client type (e.g., a carrier OTT IMAP VVM client) and indicate SMS delivery is requested and not visual voicemail client mailbox delivery. The device configuration information may include a value indicating the operating system of the UE 102 and/or a value indicating whether visual voicemail client is a native visual voicemail client (e.g., in operating systems which allow for or support native visual voicemail clients). The voicemail profile may include subscriber preferences or similar parameters for activation of voicemail transcription delivery. For example, the voicemail profile may include a value that indicates whether the subscriber desires e-mail delivery of voicemail transcriptions. Similar values may be included in the voicemail profile regarding delivery of voicemail transcriptions as SMS or/and within the visual voicemail client's mailbox.

For example, the enterprise VMAS 128 may compare the values returned from the EEIR, in the VVM activation request, and parameter in the voicemail profile against an internal lookup table to determine certain device configuration parameters in the voicemail profile for the UE 102. The lookup table may provide, for different values of the device configuration information, the parameter(s) from the voicemail profile and/or the VVM activation request, a set of one or more modes of delivery of voicemail transcription allowed by a carrier network for delivery of voicemail transcription to the user device via SMS, Email or via the visual voicemail client.

At 164-166, the enterprise VMAS 128 may configure the system 160 based on the device configuration parameters. For example, at 164, the enterprise VMAS 128 may set or store the value "dt" or DeviceType, Visual Voicemail Notification Type that may indicate the visual voicemail client type of the UE 102 and one or more values (e.g. Voice2Text Notification Type) indicating transcription delivery modes to be used for the UE 102 in the voicemail profile database 132 based on the variables above. At 166, the enterprise VMAS 128 may store a value indicating whether an IMAP client has been activated for the UE 102 in the enterprise voicemail message store 130.

At 168, the enterprise VMAS 128 may then notify the UE 102 of the activation. In the case of activation of an IMAP client, at 168A, the enterprise VMAS 128 may send a response to the VVM activation request to the SMSC 122 and, at 170A, the SMSC 122 may forward the response to the UE 102. For example, the enterprise VMAS 128 may send a VVM provisioning STATUS SMS notification containing the voicemail message store's fully qualified domain name (FQDN) and the subscriber IMAP login credentials to the SMSC 122. The SMSC 122 may deliver the VVM STATUS SMS notification received from enterprise VMAS 128 to the IMAP VVM client on the UE 102. In the case of activation of a REST client, at 168B, the enterprise VMAS 128 may send a response to the GET VVM Service Profile request to the enterprise voicemail message store 130 and, at 170B, the enterprise voicemail message store 130 may forward the response to the UE 102 via the consumer WSG 124. In some examples, the response may contain a VVM service profile containing flags that may reflect the activation and provisioning status information of the subscriber. In the above example, the VVM Service Profile for REST VVM clients is activated by default for enterprise users during initial provisioning of the subscriber's voicemail profile on enterprise voicemail profile database and enterprise voicemail message store. Therefore, once REST VVM client validates the values of VVM Service Profile parameters in the GET VVM Service Profile response, it doesn't send a REST VVM activation request.

Following the operations illustrated in FIGS. 1A-1C, voicemail transcription delivery may be activated and configured on the UE 102. Depending on the implementation, the activated modes of delivery (e.g., SMS, e-mail, within VVM client's mailbox, etc.) may be changed, for example, via a REST VVM client interface, via a web interface, or by the subscriber switching user equipment and so on. Upon receiving a request to change the modes of delivery or being notified of an event that may require changes to the voicemail transcription delivery configuration, the enterprise VMAS 128 may alter the voicemail subscriber profile to implement the requested changes. In the case of activation of new mode of delivery, the enterprise VMAS 128 may initiate a process similar to that shown in FIGS. 1B-1C to determine if the new mode of delivery is available for the type of device and type of VVM client of the UE.

Following the operations of FIGS. 1A-1C, when a voicemail is received, the enterprise VMAS may obtain a transcription of the voicemail and cause the voicemail transcription to be delivered in accordance with the voicemail transcription delivery configuration in the voicemail profile of the subscriber.

For example, when the subscriber misses a call, the call may be forwarded to the enterprise VMAS 128. The enterprise VMAS 128 may retrieve subscriber's voicemail profile from the enterprise voicemail profile database 132.

The enterprise VMAS may cause the subscriber's greetings to be played to the far end caller. The far end caller may record a voicemail what the enterprise VMAS 128 may cause to be stored in the enterprise voicemail message store 130. The enterprise VMAS 128 may then send the voicemail audio file to a transcription service (e.g., an automated transcription service). The transcription service may generate a voicemail transcription that is provided to the enterprise VMAS 128.

The voicemail transcription may then be delivered by each of the delivery modes indicated in the subscriber's voicemail profile.

If the subscriber's voicemail profile indicates voicemail transcription is to be delivered by SMS, the enterprise VMAS 128 may send a SMS message waiting indicator (MWI) for VM notification, a VVM notification and the transcription in a SMS to the SMSC. The SMSC may deliver the SMS MWI, VVM notification and transcription SMS to IMAP and/or REST VVM client on the UE 102.

If the subscriber's voicemail profile indicates voicemail transcription is to be delivered to the mailbox of the VVM client, the enterprise VMAS 128 may append the transcription to the voicemail message in the enterprise voicemail message store 130. In the case of an IMAP VVM client, the enterprise VMAS 128 may send a VVM notification in an SMS to the SMSC. The SMSC may deliver the VVM notification to the IMAP VVM client on the UE 102. The IMAP VVM client may retrieve the voicemail with transcription, for example, after successful login and authentication. In the case of a REST VVM client, the enterprise voicemail message store 130 may send VVM and voice to text (V2T) push notifications via a secure push proxy (SPP) server and, for example, a Google Cloud Messaging (GCM) Push Service to the REST VVM client on the UE 102. After receiving the VVM and V2T push notifications the REST VVM client may send a request to retrieve the voicemail and transcript object to the consumer WSG 124. The consumer WSG 124 may query a consumer voicemail profile database 126 to check if the subscriber associated with the message retrieval request is an enterprise subscriber (e.g. by sending an XCAP request to the consumer voicemail profile database to check if parameter "LineType=UCCGSM"). If the subscriber is an enterprise subscriber, then the consumer WSG 124 may then forward the request to the enterprise voicemail message store 130. The enterprise voicemail message store may return the voicemail and transcript object to the consumer WSG 124. The consumer WSG 124 may then forward the voicemail and transcript object to the REST VVM client.

If the subscriber's voicemail profile indicates voicemail transcription is to be delivered by e-mail, the enterprise VMAS 128 may send the voicemail with the transcription to a message transfer agent (MTA) server of the carrier network. The MTA server may provide the voicemail audio file and the transcription to a message delivery agent. The message delivery agent may then send an email notification with the voicemail audio file and transcription to the e-mail client(s) on the UE 102.

The above delivery operations are merely examples. Delivery operations may vary depending on the implementation and operations may be combined, added or excluded depending on various combinations of delivery modes specified by the subscriber's voicemail profile. These and other variations would be understood by one of ordinary skill in the art in view of this disclosure.

FIG. 2 illustrates an example method 200 for providing configuration of voicemail transcription delivery based on device configuration information set by an operator of a carrier network, parameters in a voicemail profile and/or a VVM activation request, according to some implementations. More particularly, FIG. 2 may illustrate operations of a VMAS (e.g., enterprise VMAS 128) that may provide configuration of voicemail transcription delivery based on device configuration information set by an operator of a carrier network, parameters in a voicemail profile and/or a VVM activation request.

At 202, a voicemail service node (e.g., the enterprise VMAS) may receive, from a visual voicemail client on a user device, a request to activate delivery of voicemail transcription for the user device. As discussed above, in some examples, the VVM activation request may include a value that may indicate the visual voicemail client type of the UE 102 and/or a type of delivery to be activated. For example, a first value of "dt" may indicate the visual voicemail client is a first client type (e.g., a native IMAP client), a second value may indicate the visual voicemail client is a second client type (e.g., a carrier OTT IMAP VVM client) and indicate visual voicemail client mailbox delivery is requested and not SMS delivery, and a third value may indicate the visual voicemail client is the second client type (e.g., a carrier OTT IMAP VVM client) and indicate SMS delivery is requested and not visual voicemail client mailbox delivery.

At 204, the voicemail service node may determine device configuration information for delivery of voicemail transcription for the user device via the voicemail client. The device configuration information may include a value indicating the operating system of the UE 102 and/or a value indicating whether visual voicemail client is a native visual voicemail client (e.g., in operating systems which allow for or support native visual voicemail clients). As discussed above, the voicemail service node may be an enterprise VMAS that may retrieve the device configuration information from an EEIR. Upon receiving a request for the device configuration information from the enterprise VMAS, the EEIR may pull the device configuration information from the EIRD. The device configuration information may be stored or retrieved by the EIRD as discussed above. For example, an operator device may receive input of device configuration information from an operator associated with the telecommunication system. In some examples, the device configuration information may be or be associated with device configuration information for a type of device and/or a type of visual voicemail client. The device configuration information may be provided to the DTAC database by the operator device. The device configuration information may be stored in the DTAC database such that the device configuration information may be accessible to an EIR database. For example, the EIRD may pull the device configuration information from the DTAC database in response to the request or the EIRD may periodically synchronize the latest device configuration information from the DTAC database.

At 206, the voicemail service node may determine one or more parameters from a voicemail profile associated with the user device. For example, the voicemail service node may retrieve a voicemail profile associated with the subscriber of the user device from a voicemail profile database. The voicemail profile may include subscriber preferences or similar parameters for activation of voicemail transcription delivery. For example, the voicemail profile may include a value that indicates whether the subscriber desires e-mail delivery of voicemail transcriptions. Similar values may be included in the voicemail profile regarding delivery of voicemail transcriptions as SMS or/and within the visual voicemail client's mailbox.

At 208, the voicemail service node may determine, based on the device configuration information, the parameter(s) from the voicemail profile and/or the VVM activation request, a delivery configuration for delivery of voicemail transcription via the voicemail client using a set of one or more modes of delivery of voicemail transcription. For example, the voicemail service node may be an enterprise VMAS and may configure voicemail transcription delivery for the UE based on the device configuration information for the device type and/or visual voicemail client type of the UE, the voicemail profile and/or the VVM activation request. For example, the enterprise VMAS may compare the values returned from an EEIR, in the VVM activation request, and parameters in the voicemail profile against an internal lookup table to determine device configuration parameters for the UE. The internal lookup table may provide, for different values of the device configuration information, the parameter(s) from the voicemail profile and/or the activation request, a set of one or more modes of delivery of voicemail transcription allowed by a carrier network for delivery of voicemail transcription for the user device via the voicemail client.

At 210, based on the delivery configuration, the voicemail service node may configure the voicemail profile associated with the user device (and/or other components of the telecommunication system) to cause delivery of voicemail transcription to the user device using the set of one or more modes of delivery of voicemail transcription. For example, the voicemail service node may be an enterprise VMAS that may set or store the value "dt" or DeviceType that may indicate the visual voicemail client type of the UE and one or more values indicating transcription delivery modes to be used for the UE in the voicemail profile database based on the variables above. The enterprise VMAS may store a value indicating whether an IMAP client has been activated for the UE in the enterprise voicemail message store.

After voicemail transcription delivery is configured in response to the VVM activation request, the voicemail service node may receive a voicemail associated with the user device at 212. At 214, based on the configuration included in the voicemail profile, the voicemail service node may deliver the voicemail transcription of the voicemail via one or more modes of delivery of voicemail transcription.

Additional details of the operations shown in FIG. 2 are provided above with regard to FIGS. 1A-1C and are not repeated here to avoid unnecessary verbosity.

Figure 3:
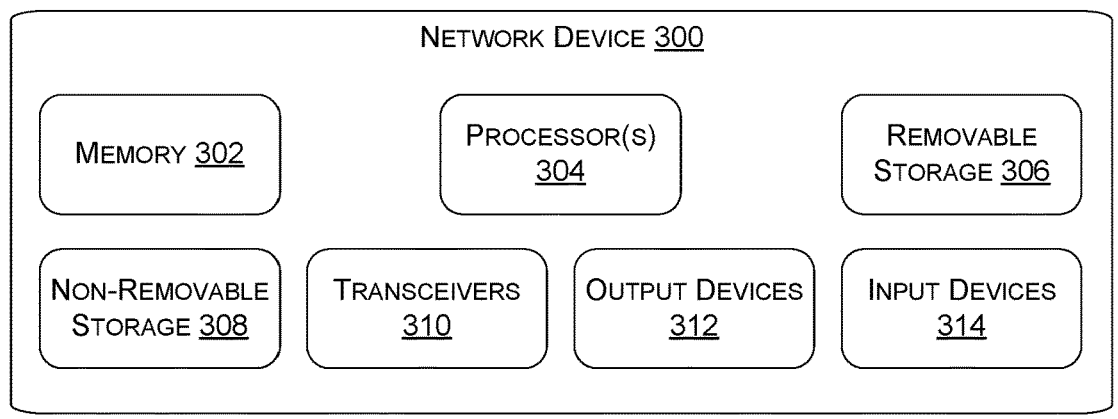
FIG. 3 is a block diagram illustrating relevant high-level components of a device that may be used to implement various of the components described herein.

FIG. 3 illustrates a component level view of a telecommunication network device 300 capable of implementing the UE 102, the operator device 104, the DTAC database 106, the EIR database 108, the SMSC 122, the consumer WSG 124, the consumer voicemail profile database 126, the enterprise VMAS 128, the enterprise voicemail message store 130, the enterprise voicemail profile database 132 and the EEIR 134 of FIGS. 1A-1C. The network device 300 may, as an example, comprise a physical or virtual device. The network device 300 may comprise a system memory 302 storing various executable components and data for implementing the systems and methods 100-200 of FIGS. 1-2. The network device 300 may further comprise processor(s) 304, a removable storage 306, a non-removable storage 308, transceivers 310, output device(s) 312, and input device(s) 314, any or all of which can be communicatively connected via a communications bus (not shown).

In various examples, the system memory 302 is volatile (such as RAM), non-volatile (such as ROM, flash memory, etc.) or some combination of the two. In some examples, the processor(s) 304 is a central processing unit (CPU), a graphics processing unit (GPU), or both CPU and GPU, or any other sort of processing unit.

The network device 300 also includes additional data storage devices (removable and/or non-removable) such as, for example, magnetic disks, optical disks, or tape. Such additional storage is illustrated in FIG. 4 by removable storage 306 and non-removable storage 308. The system memory 302, removable storage 306 and non-removable storage 308 are all examples of non-transitory computer-readable storage media.

In some examples, the transceivers 310 include any sort of transceivers known in the art. For example, transceivers 310 may include a radio transceiver that performs the function of transmitting and receiving radio frequency communications. Also, or instead, the transceivers 310 may include other wireless or wired connectors, such as Ethernet connectors or near-field antennas. The transceivers 310 may facilitate connectivity between a public network, such as a packet-switched access network (not shown), and one or more other devices of a telecommunication network.

In some examples, the output devices 312 include any sort of output devices known in the art, such as a display, speakers, a vibrating mechanism, or a tactile feedback mechanism. Output devices 312 also include ports for one or more peripheral devices, such as headphones, peripheral speakers, or a peripheral display.

In various examples, the input devices 314 include any sort of input devices known in the art. For example, the input devices 314 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, by a voicemail service node from a visual voicemail client on a user device, a VVM activation request to activate delivery of voicemail transcription for the user device via the visual voicemail client;
   determining, by the voicemail service node, device configuration information for delivery of voicemail transcription for the user device via the visual voicemail client;
   determining, by the voicemail service node, one or more parameters for voicemail transcription delivery from a voicemail profile associated with the user device;
   determining, based on the device configuration information, on the one or more parameters from the voicemail profile, and on the VVM activation request, a delivery configuration for delivery of voicemail transcription via the visual voicemail client using a set of one or more modes of delivery of voicemail transcription allowed by a carrier network for delivery of voicemail transcription for the user device via the visual voicemail client, wherein the determining the device configuration information comprises:
      receiving the device configuration information from an enhanced equipment identity register, the device configuration information including carrier specified information associated with a device identifier of the user device, the carrier specified information indicating an operating system of the user device and a client type of the visual voicemail client;
   based on the delivery configuration, configuring the voicemail profile associated with the user device to cause delivery of voicemail transcription to the user device using the set of one or more modes of delivery of voicemail transcription;
   receiving, by the voicemail service node, a voicemail associated with the user device; and
   based on the voicemail profile, delivering, to the user device via the visual voicemail client, a voicemail transcription of the voicemail via the set of one or more modes of delivery of voicemail transcription.

2. The method of claim 1, wherein the set of one or more modes of delivery of voicemail transcription comprises one or more of a native retrieval functionality of the visual voicemail client, delivery via short message service (SMS), or delivery via e-mail.

3. The method of claim 1, wherein the VVM activation request includes one or more parameters associated with a client type of the visual voicemail client and at least one mode of the set of one or more modes of delivery of voicemail transcription.

4. The method of claim 1, further comprising:
   receiving, from the user device via another visual voicemail client, another activation request to activate delivery of voicemail transcription for the user device via another voicemail client; and
   determining, based on the device configuration information, on the one or more parameters from the voicemail profile, and on the other activation request, another delivery configuration for delivery of voicemail transcription via the other voicemail client using another set of one or more modes of delivery of voicemail transcription allowed by the carrier network for delivery of voicemail transcription for the user device via the other voicemail client.

5. A system comprising:
   one or more computing devices of a carrier network configured to perform operations comprising:
   receiving, by a voicemail service node from a voicemail client on a user device, a VVM activation request to activate delivery of voicemail transcription for the user device via the voicemail client;
   determining, by the voicemail service node, device configuration information for delivery of voicemail transcription for the user device via the voicemail client;
   determining, based on the device configuration information and the VVM activation request, a delivery configuration for delivery of voicemail transcription via the voicemail client using a set of one or more modes of delivery of voicemail transcription for the user device via the voicemail client, wherein the determining the device configuration information comprises:
      receiving the device configuration information from an enhanced equipment identity register, the device configuration information including carrier specified information associated with a device identifier of the user device, the carrier specified information indicating an operating system of the user device and a client type of the voicemail client; and
   based on the delivery configuration, configuring a voicemail profile associated with the user device to cause delivery of voicemail transcription to the user device using the set of one or more modes of delivery of voicemail transcription.

6. The system of claim 5, the operations further comprising:
   receiving, by the voicemail service node, a voicemail associated with the user device; and
   based on the voicemail profile, delivering, to the user device via the voicemail client, a voicemail transcription of the voicemail via the set of one or more modes of delivery of voicemail transcription.

7. The system of claim 5, the operations further comprising:
   determining, by the voicemail service node, one or more parameters for voicemail transcription delivery from the voicemail profile associated with the user device, wherein the determining of the delivery configuration for the delivery of voicemail transcription via the voicemail client using the set of one or more modes of delivery of voicemail transcription is further based at least in part on the one or more parameters from the voicemail profile.

8. The system of claim 7, the operations further comprising:
   receiving, from the user device via another voicemail client, another activation request to activate delivery of voicemail transcription for the user device via the other voicemail client; and determining, based on the device configuration information, on the one or more parameters from the voicemail profile, and on the other activation request, another delivery configuration for delivery of voicemail transcription via the other voicemail client using another set of one or more modes of delivery of voicemail transcription allowed by the carrier network for delivery of voicemail transcription for the user device via the other voicemail client.

9. The system of claim 5, wherein the VVM activation request includes one or more parameters associated with a client type of the voicemail client and the set of one or more modes of delivery of voicemail transcription.

10. The system of claim 5, wherein the set of one or more modes of delivery of voicemail transcription comprises one or more of a native retrieval functionality of the visual voicemail client, delivery via short message service (SMS), or delivery via e-mail.

11. The system of claim 5, wherein the determining of the delivery configuration for delivery of voicemail transcription via the voicemail client is based on a carrier network specified set of one or more modes of delivery of voicemail transcription allowed by the carrier network for delivery of voicemail transcription for the user device via the voicemail client, the carrier network specified set of one or more modes of delivery of voicemail transcription including the set of one or more modes of delivery of voicemail transcription.

12. A non-transitory computer-readable media storing computer-executable instructions, which when executed by one or more processors, cause the one or more processors to perform operations comprising:
  receiving, by a voicemail service node from a visual voicemail client on a user device, a VVM activation request to activate delivery of voicemail transcription for the user device via the visual voicemail client;
  determining, by the voicemail service node, device configuration information for delivery of voicemail transcription for the user device via the visual voicemail client;
  determining, based on the device configuration information and the VVM activation request, a delivery configuration for delivery of voicemail transcription via the visual voicemail client using a set of one or more modes of delivery of voicemail transcription allowed by a carrier network for delivery of voicemail transcription for the user device via the visual voicemail client, wherein the determining the device configuration information comprises:
    receiving the device configuration information from an enhanced equipment identity register, the device configuration information including carrier specified information associated with a device identifier of the user device, the carrier specified information indicating an operating system of the user device and a client type of the visual voicemail client; and
  based on the delivery configuration, configuring a voicemail profile associated with the user device to cause delivery of voicemail transcription to the user device using the set of one or more modes of delivery of voicemail transcription.

13. The non-transitory computer-readable media of claim 12, the operations further comprising:
  receiving, by the voicemail service node, a voicemail associated with the user device; and
  based on the voicemail profile, delivering, to the user device via the visual voicemail client, a voicemail transcription of the voicemail via the set of one or more modes of delivery of voicemail transcription.

14. The non-transitory computer-readable media of claim 12, the operations further comprising:
  determining, by the voicemail service node, one or more parameters for voicemail transcription delivery from the voicemail profile associated with the user device, wherein the determining of the delivery configuration for the delivery of voicemail transcription via the visual voicemail client using the set of one or more modes of delivery of voicemail transcription is further based at least in part on the one or more parameters from the voicemail profile.

15. The non-transitory computer-readable media of claim 14, the operations further comprising:
  receiving, from the user device via another voicemail client, another activation request to activate delivery of voicemail transcription for the user device via the other voicemail client; and
  determining, based on the device configuration information, on the one or more parameters from the voicemail profile, and on the other activation request, another delivery configuration for delivery of voicemail transcription via the other voicemail client using another set of one or more modes of delivery of voicemail transcription allowed by the carrier network for delivery of voicemail transcription for the user device via the other voicemail client.

16. The non-transitory computer-readable media of claim 12, wherein the VVM activation request includes one or more parameters associated with a client type of the visual voicemail client and the set of one or more modes of delivery of voicemail transcription.

17. The non-transitory computer-readable media of claim 12, wherein the set of one or more modes of delivery of voicemail transcription comprises one or more of a native retrieval functionality of the visual voicemail client, delivery via short message service (SMS), or delivery via e-mail.

* * * * *